(12) United States Patent
Tsuji et al.

(10) Patent No.: US 8,499,223 B2
(45) Date of Patent: Jul. 30, 2013

(54) RECEIVING APPARATUS, RECEIVING METHOD AND NON-TRANSITORY COMPUTER READABLE RECORDING MEDIUM FOR RECORDING RECEIVING PROGRAM

(75) Inventors: Masashi Tsuji, Tokyo (JP); Shunichi Gondo, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 163 days.

(21) Appl. No.: 13/107,060

(22) Filed: May 13, 2011

(65) Prior Publication Data

US 2012/0131421 A1    May 24, 2012

(30) Foreign Application Priority Data

Nov. 19, 2010   (JP) ................................. 2010-259380

(51) Int. Cl.
*H03M 13/00*    (2006.01)
(52) U.S. Cl.
USPC ......................................... 714/776; 714/752
(58) Field of Classification Search
USPC ................. 714/776, 752, 781, 784, 786, 788, 714/758, 751, 712
See application file for complete search history.

(56) References Cited

U.S. PATENT DOCUMENTS

| | | | |
|---|---|---|---|
| 6,490,705 B1 | 12/2002 | Boyce | |
| 7,085,282 B2 | 8/2006 | Belotserkovsky et al. | |
| 7,904,781 B2 | 3/2011 | Sugai et al. | |
| 8,311,122 B2 * | 11/2012 | Kure et al. | 375/240.24 |
| 8,358,704 B2 * | 1/2013 | Shi et al. | 375/240.27 |
| 2005/0002416 A1 | 1/2005 | Belotserkovsky et al. | |
| 2007/0300134 A1 | 12/2007 | Sugai et al. | |
| 2012/0131408 A1 * | 5/2012 | Tada et al. | 714/752 |

FOREIGN PATENT DOCUMENTS

| | | | |
|---|---|---|---|
| JP | 2000-134620 | * | 5/2000 |
| JP | 2003-529289 | | 9/2003 |
| WO | 2005/006617 | * | 1/2005 |
| WO | 2005-027439 A1 | | 3/2005 |
| WO | 2006/061902 | * | 6/2006 |

OTHER PUBLICATIONS

Japanese Patent Application No. 2010-259380, Notice of Reasons for Rejection, mailed Oct. 18, 2011, (with English Translation).

(Continued)

*Primary Examiner* — Christine Tu
(74) *Attorney, Agent, or Firm* — Blakely, Sokoloff, Taylor & Zafman LLP

(57) ABSTRACT

According to one embodiment, a receiving apparatus includes a data packet receiver, a quality reinforcement packet receiver, an information setting module, a packet processor, a recovery processor. The data packet receiver is configured to receive a data packet comprising a data portion. The quality reinforcement packet receiver is configured to receive a quality reinforcement packet comprising a quality reinforcement portion. The information setting module is configured to set the data portion corresponding to a part of information included in the data packet as a recovery process target. The packet processor is configured to determine whether there is a lost data packet based on the received data packet and the quality reinforcement packet. The recovery processor is configured to recover, when there is the lost data packet, at least the data portion set as the recovery process target in the lost data packet by using the data portion set as the recovery process target in a non-lost data packet and the quality reinforcement portion corresponding thereto.

4 Claims, 4 Drawing Sheets

OTHER PUBLICATIONS

Boyce J M, Packet Loss Resilient Transmission of MPEG Video Over the Internet, Signal Processing: Image Communication, Elsevier Science Publishers, Sep. 1999, vol. 15, Nr. 1-2, pp. 7-24.

Youshi Xu, et al., Variable Shortend-and-Punctured Reed-Solomon Codes for Packet Loss Protection, Broadcasting, IEEE transactions on, Sep. 2002, vol. 48, Issue: 3, pp. 237-245.

* cited by examiner

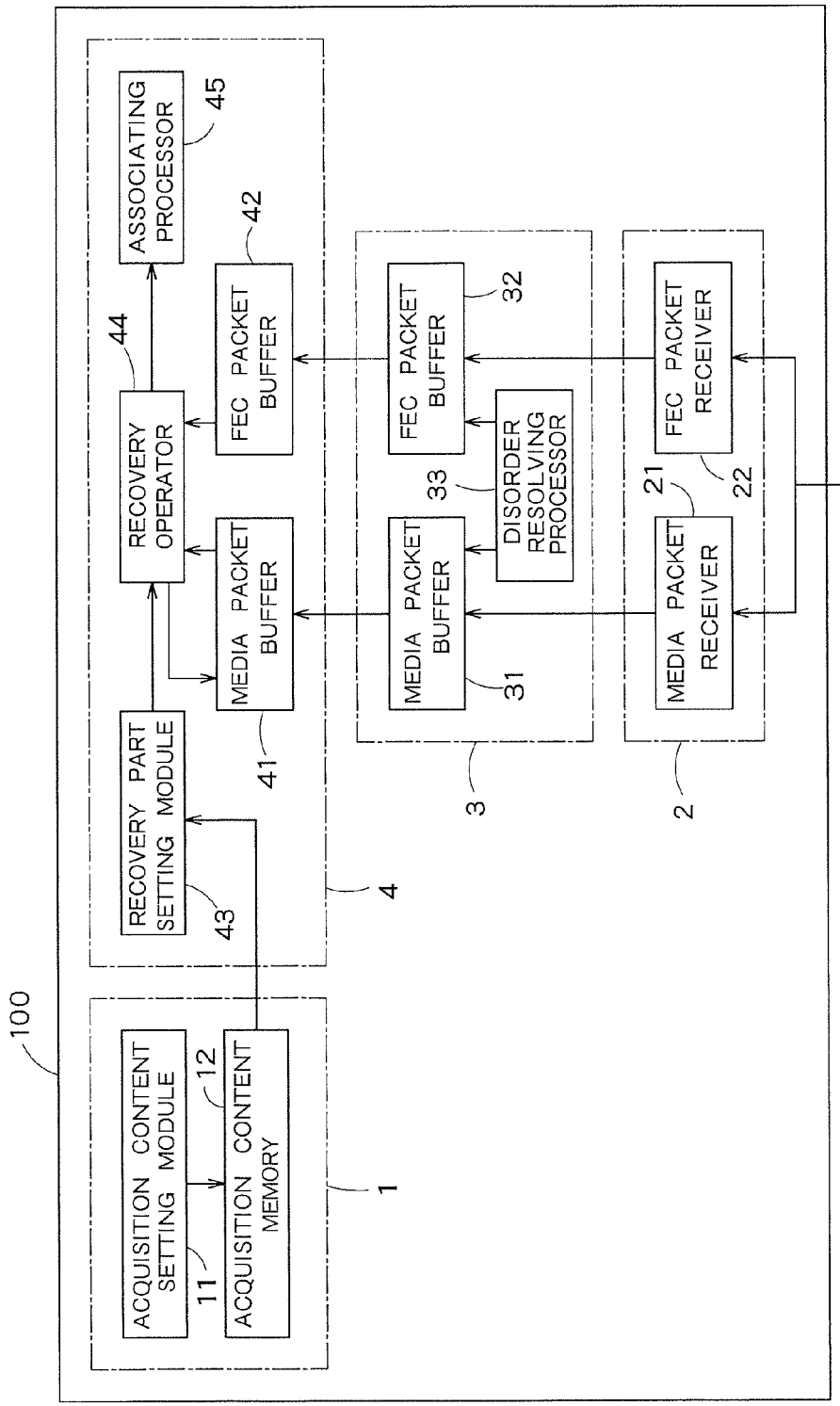
F I G. 1

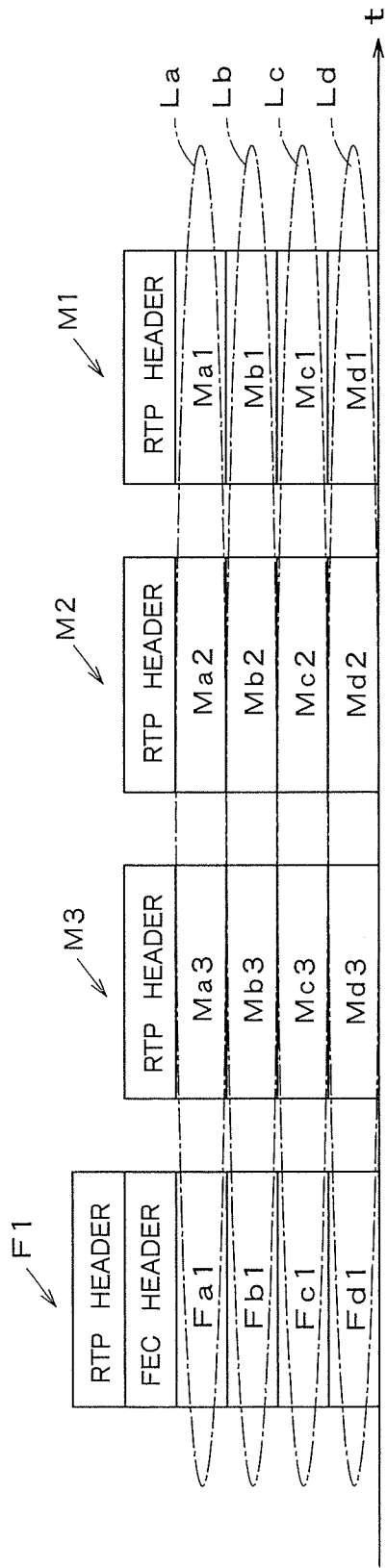
F I G. 2

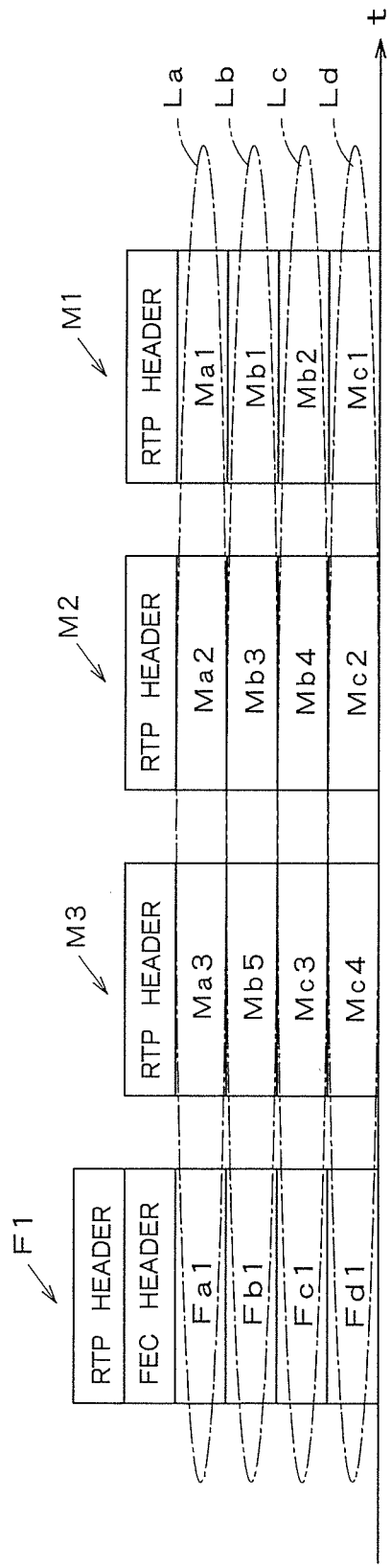
F I G. 4

RECEIVING APPARATUS, RECEIVING METHOD AND NON-TRANSITORY COMPUTER READABLE RECORDING MEDIUM FOR RECORDING RECEIVING PROGRAM

CROSS REFERENCE TO RELATED APPLICATIONS

This application is based upon and claims the benefit of priority from the prior Japanese Patent Application No. 2010-259380, filed on Nov. 19, 2010, the entire contents of which are incorporated herein by reference.

FIELD

Embodiments described herein relate generally to a receiving apparatus, a receiving method and a non-transitory computer readable recording medium for recording receiving program.

BACKGROUND

In recent years, there has been spreading an IPTV (Internet Protocol TV) scheme for sending contents using an internet line as a transmission line. In the IPTV scheme, whole content is divided into a media packet as a unit, and a stream obtained by multiplexing these media packets is transmitted. The media packets are not always correctly transmitted from a transmitter to a receiving apparatus, and the packets may be lost.

A recovery technique such as an FEC (Forward Error Correction) encoding transmission is used to recover the lost packets. In the FEC technique, a plurality of packets are grouped, and an FEC packet is generated for each group by performing a predetermined operation and transmitted on the stream. When a packet in a group is partially lost, the receiving apparatus can recover the lost packet by performing a predetermined operation using the FEC packet. In this technique, because the receiving apparatus does not have to request the transmitter to retransmit the packet, this technique is suitable for the IPTV scheme requiring real-time processing.

In order to reduce the delay time since the receiving apparatus receives the stream until the stream is displayed on a display device, the lost packets should be efficiently recovered using the FEC packets.

BRIEF DESCRIPTION OF THE DRAWINGS

FIG. 1 is a schematic block diagram of a receiving apparatus 100 according to a first embodiment.

FIG. 2 is a diagram showing an example of a configuration of a stream received by the receiving apparatus 100 of FIG. 1.

FIG. 4 is a diagram showing an example of a configuration of a stream in a case of transmitting each of the contents at the VBR.

DETAILED DESCRIPTION

Figure 3:
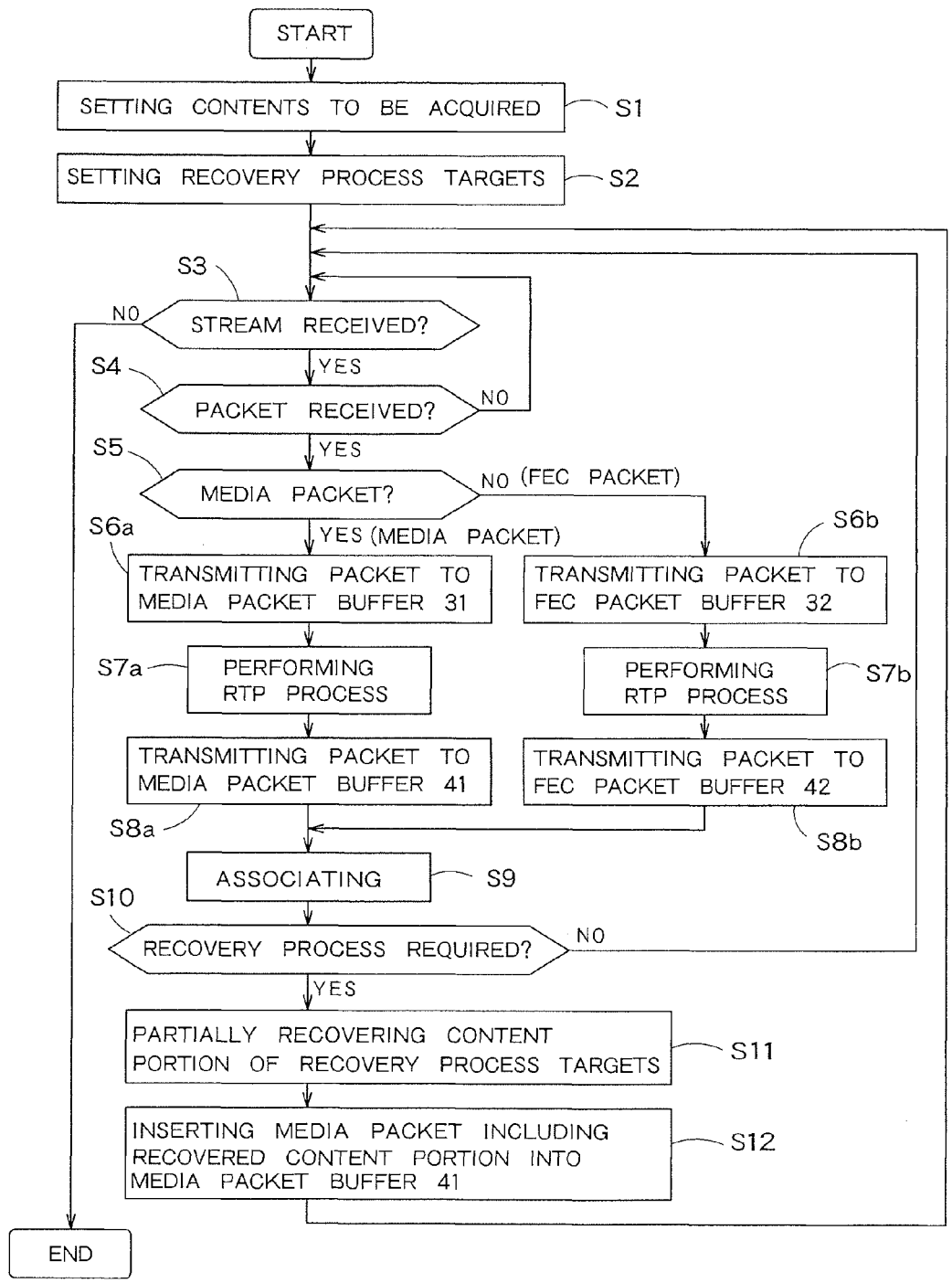
FIG. 3 is a flowchart showing the processing operation performed by the receiving apparatus 100 of FIG. 1.

In general, according to one embodiment, a receiving apparatus includes a data packet receiver, a quality reinforcement packet receiver, an information setting module, a packet processor, a recovery processor. The data packet receiver is configured to receive a data packet comprising a data portion. The quality reinforcement packet receiver is configured to receive a quality reinforcement packet comprising a quality reinforcement portion. The information setting module is configured to set the data portion corresponding to a part of information included in the data packet as a recovery process target. The packet processor is configured to determine whether there is a lost data packet based on the received data packet and the quality reinforcement packet. The recovery processor is configured to recover, when there is the lost data packet, at least the data portion set as the recovery process target in the lost data packet by using the data portion set as the recovery process target in a non-lost data packet and the quality reinforcement portion corresponding thereto.

Embodiments will now be explained with reference to the accompanying drawings.

First Embodiment

FIG. 1 is a schematic block diagram of a receiving apparatus 100 according to a first embodiment. Further, FIG. 2 is a diagram showing an example of a configuration of a stream received by the receiving apparatus 100 of FIG. 1. The receiving apparatus 100 of FIG. 1 receives the stream of FIG. 2 obtained by multiplexing data of a plurality of video signals, sound signals, etc. divided into packets as a unit through a network 200 such as Ethernet (registered trademark) or wireless LAN (Local Area Network).

FIG. 2 shows an example where the stream is based on RTP (Real-time Transport Protocol), and includes media packets (data packet) M1 to M3 and an FEC packet (quality reinforcement packet) F1. Because the media packets M1 to M3 are similarly configured, the media packet M1 will be explained as a representative.

The media packet M1 has an RTP header and content portions (data portions) Ma1 to Md1. The RTP header includes additional information such as payload type, order, process timing, time stamp, etc. The content portions Ma1 to Md1 are obtained by dividing contents, "A" to "D" respectively. The media packet M1 includes a part of one of a plurality of different contents (information). Note that, FIG. 2 shows an example where each of the contents is transmitted at a constant bit rate (CBR).

In the present embodiment, each of the content portions Ma1 to Md1 has a size of "192" Bytes. That is, 0 to 191st Bytes (excepting the RTP header) of the media packet M1 (hereinafter referred to as layer La) correspond to the content portion Ma1, 192 to 383rd Bytes (hereinafter referred to as layer Lb) correspond to the content portion Mb1, 384 to 575th Bytes (hereinafter referred to as layer Lc) correspond to the content portion Mc1, and 576 to 767th Bytes (hereinafter referred to as layer Ld) correspond to the content portion Md1.

On the other hand, the FEC packet F1 has an RTP header, an FEC header, and FEC portions Fa1 to Fd1. The RTP header includes additional information similar to the above. The FEC header includes information for associated the FEC packet with the media packet.

In the present embodiment, the FEC packet F1 is associated with the media packets M1 to M3. More specifically, the FEC portion Fa1 is generated by performing a predetermined operation (such as exclusive OR operation) using the content portions Ma1 to Ma3. Since the content portions Ma1 to Ma3 and the FEC portion Fa1 are in the same layer La, they are automatically associated with each other. The other FEC portions and the other content portions are similar. In this case, even if one of the media packets M1 to M3 is lost, the lost media packet can be recovered by using the other media packets and the FEC packet F1.

The receiving apparatus 100 of FIG. 1 has a content selector 1, a receiver 2, an RTP processor 3 and a recovery processor 4.

The content selector 1 has an acquisition content setting module (information setting module) 11 and an acquisition content memory 12. The acquisition content setting module 11 sets, in the acquisition content memory 12, one or more contents to be acquired among the contents "A" to "D". The acquisition content memory 12 stores the set contents.

The receiver 2 receives the stream transmitted from a transmitter (not shown) through the network 200. Then, a media packet receiver (data packet receiver) 21 in the receiver 2 receives the media packets M1 to M3 in the stream, and an FEC packet receiver 22 (quality reinforcement packet receiver) 22 receives the FEC packet F1.

The RTP processor 3 has a media packet buffer 31, an FEC packet buffer 32 and a disorder resolving processor 33. The media packet buffer 31 and the FEC packet buffer 32 temporarily store the media packets M1 to M3 and the FEC packet F1 received by the receiver 2, respectively. Then, the disorder resolving processor 33 performs an RTP processing such as a disorder resolving processing on the media packets M1 to M3 and the FEC packet F1, based on the additional information included in the RTP header. The processed media packets M1 to M3 and FEC packet F1 are transmitted to the recovery processor 4.

The recovery processor 4 has a media packet buffer (data packet buffer) 41, an FEC packet buffer (quality reinforcement packet buffer) 42, a recovery part setting module 43, a recovery operator 44 and an associating processor (packet processor) 45.

The media packet buffer 41 and the FEC packet buffer 42 temporarily store the media packets and FEC packet transmitted from the RTP processor 3, respectively. The recovery part setting module 43 sets only the contents set in the acquisition content memory 12 as recovery process targets. The recovery operator 44 transmits the media packets M1 to M3 in the media packet buffer 41 and the FEC packet F1 in the FEC packet buffer 42 to the associating processor 45.

The associating processor 45 associates the FEC portion with the content portion based on the information of the FEC header in the FEC packet. Then, the associating processor 45 determines whether or not there is a lost content portion on which recovery operation should be performed. In accordance with this determination result, the recovery operator 44 recovers the lost content portion by performing a predetermined operation (such as exclusive OR operation). Then, the recovery operator 44 inserts the recovered content portion into the media packet buffer 41.

FIG. 3 is a flowchart showing the processing operation performed by the receiving apparatus 100 of FIG. 1. Firstly, the acquisition content setting module 11 sets, in the acquisition content memory 12, one or more contents to be acquired based on the instruction by a user, for example (step S1). Then, the recovery part setting module 43 sets only the set contents as recovery process targets (step S2).

For example, when the acquisition content setting module 11 sets the content "B" of FIG. 2, the recovery part setting module 43 sets the layer Lb corresponding to the content portions Mb1 to Mb3 of the media packets M1 to M3 as the recovery process target. The layer information corresponding to the content may be obtained from the information of the FEC header indicative of corresponding information between the FEC portion Fb and the content portions Mb, may be notified to the receiving apparatus 100 at the start of transmission process, or may be obtained based on predetermined rules between the transmitter (not shown) and the receiving apparatus 100. Further, when the acquisition content setting module 11 sets a plurality of successive contents, for example the contents "B" and "C", the recovery part setting module 43 combines the layer Lb (192 to 383rd Bytes) and the layer Lc (384 to 575th Bytes) corresponding to the content portions Mb1 to Mb3 and Mc1 to Mc3 respectively to set the combined 192 to 575th Bytes into one data block as a recovery process target. Hereinafter, explanation will be made on an example where the contents "B" and "C" are set.

When a packet is received (YES at step S4) while receiving a stream (YES at step S3), the media packet receiver 21 receives the packet if the received packet is a media packet, and the FEC packet receiver 22 receives the packet if the received packet is an FEC packet. Whether the received packet is a media packet or an FEC packet is determined by the payload type in the RTP header, for example (step S5).

The media packet receiver 21 transmits the received media packets M1 to M3 to the media packet buffer 31 in the RTP processor (step S6a), and the FEC packet receiver 22 transmits the received FEC packet F1 to the FEC packet buffer 32 in the RTP processor 3 (step S6b). Then, the disorder resolving processor 33 performs the RTP process such as a disorder resolving process on the media packets and FEC packet based on the additional information included in the RTP header (steps S7a and S7b). By performing this process, although the order of the media packets and so on can be corrected, lost packets cannot be recovered.

After that, the media packet buffer 31 transmits the RTP-processed media packets M1 to M3 to the media packet buffer 41 in the recovery processor 4 (step S8a). Similarly, the FEC packet buffer 32 transmits the RTP-processed FEC packet F1 to the FEC packet buffer 42 in the recovery processor 4 (step S8b).

Further, the recovery operator 44 transmits the media packets M1 to M3 in the media packet buffer 41 and the FEC packet F1 in the FEC packet buffer 42 to the associating processor 45.

The associating processor 45 associates the received packets with each other (step S9). The associating process is performed based on the information of the FEC header. Here, the associating processor 45 can perform the associating process by not a unit of a content but by a unit of a packet based on the correspondence relation between the FEC packet F1 including the FEC portions Fb1 and Fc1 and the media packets M1 to M3 including the content portions Mb1 to Mb3 and Mc1 to Mc3. Thus, the associating process is performed only once even when a plurality of contents "B" and "C" are set as recovery process targets.

After that, the associating processor 45 determines whether or not there is a content portion on which recovery operation should be performed (step S10). If the media packet M2 is lost, the media packet M2 associated with the FEC packet F1 is not transmitted to the associating processor 45, and thus the associating processor 45 does not receive the media packet M2. Therefore, the associating processor 45 determines that the media packet M2 should be recovered.

The recovery operator 44 performs a predetermined operation to partially recover only the content portions Mb2 and Mc2 set as the recovery process targets in step S2 among the lost media packet M2 (step S11). More specifically, the recovery operator 44 recovers the content portion Mb2 using the content portions Mb1 and Mb3 and the FEC portion Fb1, and recovers the content portion Mc2 using the content portions Mc1 and Mc3 and the FEC portion Fc1. In practice, the recovery operation process is performed on 192 to 575th Bytes, which are the FEC portions and content portions necessary for recovering the content portions Mb and Mc.

Because the associating processor 45 receives the packet including the content portion set as the recovery process target, it is unnecessary to arrange a plurality of recovery processors 4 for each of the contents. Then, recovery operation is performed only on the content portions Mb2 and Mc2 set by the acquisition content setting module 11 as the recovery process targets, and the recovery operation is not performed on the content portions Ma2 and Md2, which are not set as the recovery process targets. As a result, it is possible to reduce throughput of the receiving apparatus 100.

The recovery operator 44 inserts the media packet including the recovered content portions Mb2 and Mc2 into the media packet buffer 41 in the recovery processor 4 (step S12). Accordingly, the media packet buffer 41 stores the media packets M1 to M3 where the lost content portions Mb2 and Mc2 are recovered. The content portions are displayed on a display such as a liquid crystal display (not shown), or stored in a recording medium such as a hard disk or a flash memory (not shown). Note that, although the content portions Ma2 and Md2 are not recovered, it does not matter since the contents "A" and "D" are not required to be acquired.

As stated above, in the first embodiment, the associating process and recovery operation are performed at one time only on the content portions requiring to be recovered, and the recovery operation is not performed on the content portions which are not required to be acquired. Therefore, the load of the receiving apparatus 100 is reduced, and thus the recovery process can be efficiently performed on the lost packets.

Second Embodiment

In the first embodiment, each of the contents is transmitted at a CBR. In a second embodiment to be explained below, each of the contents is transmitted at a variable bit rate (VBR).

FIG. 4 is a diagram showing an example of a configuration of a stream in a case of transmitting each of the contents at the VBR. In FIG. 4, the content "A" is included in the layer La, the content "B" is included in the layer Lb and a part of the layer Lc, and the content "C" is included in a part of the layer Lc and the layer Ld. Also in this case, the FEC portions Fa1 to Fd1 of the FEC packet F1 are generated by each of the layers. For example, the FEC portion Fb1 is generated from the content portions Mb1, Mb3, and Mb5 in the layer Lb, and the FEC portion Fc1 is generated from the content portions Mb2, Mb4, and Mc3 in the layer Lc.

Hereinafter, the processing operation performed by the receiving apparatus 100 will be explained focusing on the differences from the first embodiment. Firstly, it is assumed that the acquisition content setting module 11 sets the contents "B" and "C" (step S1 in FIG. 3). The content "B" is included in the layers Lb and Lc, and the content "C" is included in the layers Lc and Ld. The layer Lc is overlapped. Therefore, the recovery part setting module 43 combines the layers Lb to Ld to set the combined 192 to 767th Bytes (except the RTP header) into one data block as a recovery process target (step S2).

Further, the receiving apparatus 100 performs steps S3 to S9. In a case of VBR, each of the content portions associated with one FEC portion may include a part of different contents. Then, the associating processor 45 determines whether or not there is a content portion on which recovery operation should be performed (step S10). Here, it is assumed that the media packet M2 is lost. In this case, the recovery operator 44 performs recovery operation on 192 to 767th Bytes, which are set as the recovery process targets at step S2, to recover the lost content portions Mb and Mc (step S11).

In this way, the recovery process on the FEC portion Fc1 in the layer Lc including both of the contents "B" and "C" is performed only once, and overlapped recovery process is unnecessary. Subsequently, the receiving apparatus 100 operates similarly to the first embodiment.

As stated above, in the second embodiment, even when a plurality of contents are transmitted at a VBR, the recovery process is performed not by a unit of a content, but simultaneously on the recovery process targets. Therefore, the recovery process is not repeatedly performed on a layer including a plurality of contents (for example, the layer Lc in FIG. 4), and thus lost packets can be efficiently recovered.

Each of FIGS. 2 and 4 shows an example where each media packet includes a plurality of different contents. However, the media packet does not necessarily include different contents, and it is enough that the media packet includes a plurality of different information items. For example, each media packet may include a plurality of image information items which belong to the same content and at least one of a frame rate and resolution of which is different from each other. Further, each media packet may include a plurality of image information items each having a different viewpoint.

At least a part of the receiving apparatus 100 explained in the above embodiments can be formed of hardware or software. When the receiving apparatus 100 is partially formed of the software, it is possible to store a program implementing at least a partial function of the receiving apparatus 100 in a recording medium such as a flexible disc, CD-ROM, etc. and to execute the program by making a computer read the program. The recording medium is not limited to a removable medium such as a magnetic disk, optical disk, etc., and can be a fixed-type recording medium such as a hard disk device, memory, etc.

Further, a program realizing at least a partial function of the receiving apparatus 100 can be distributed through a communication line (including radio communication) such as the Internet etc. Furthermore, the program which is encrypted, modulated, or compressed can be distributed through a wired line or a radio link such as the Internet etc. or through the recording medium storing the program.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fail within the scope and spirit of the inventions.

The invention claimed is:
1. A receiving apparatus comprising:
a data packet receiver configured to receive a data packet comprising a plurality of data portions, each of the data portions comprising a part of one of a plurality of information items;
a quality reinforcement packet receiver configured to receive a quality reinforcement packet comprising a plurality of quality reinforcement portions, each of the quality reinforcement portions being corresponding to one or more data portions among the data portions;
an information setting module configured to select one or more information items among the information items and to set the data portion corresponding to a part of the selected information items as a recovery process target;

a packet processor configured to associate the quality reinforcement packet with the data packet corresponding thereto and to determine whether there is a lost data packet based on presence/absence of a lost data packet; and a recovery processor configured to recover, when there is the lost data packet, at least the data portion set as the recovery process target in the lost data packet by using the data portion set as the recovery process target in a non-lost data packet and the quality reinforcement portion associated with the non-lost data portion, wherein when two or more information items are selected and the data portions set as the recovery process target are overlapped, the information setting module is configured to combine the data portions set as the recovery process target into one recovery target data block, and the recovery processor is configured to recover at least the data portion set as the recovery process target in the lost data packet by using the data portion included in the combined data block and the quality reinforcement portion corresponding thereto.

2. The apparatus of claim 1, wherein the information items are one of:

a plurality of different contents;

a plurality of first video information items, frame rates and/or resolutions of the first video information items being different from each other; and a plurality of second video information items, viewpoints of the second video information items being different from each other.

3. A receiving method comprising:

receiving a data packet comprising a plurality of data portions, each of the data portions comprising a part of one of a plurality of information items;

receiving a quality reinforcement packet comprising a quality reinforcement plurality of portions, each of the quality reinforcement portions being corresponding to one or more data portions among the data portions;

selecting one or more information items among the information items;

setting the data portion corresponding to a part of the selected information items as a recovery process target;

associating the quality reinforcement packet with the data packet corresponding thereto;

determining whether there is a lost data packet based on presence/absence of a lost data packet; and recovering, when there is the lost data packet, at least the data portion set as the recovery process target in the lost data packet by using the data portion set as the recovery process target in a non-lost data packet and the quality reinforcement portion associated with the non-lost data portion, wherein when two or more information items are selected and the data portions set as the recovery process target are overlapped, the data portions set as the recovery process target are combined into one recovery target data block, and at least the data portion set as the recovery process target in the lost data packet is recovered by using the data portion included in the combined data block and the quality reinforcement portion corresponding thereto.

4. A non-transitory computer readable recording medium for recording a receiving program to cause a computer to execute:

receiving a data packet comprising a plurality of data portions, each of the data portions comprising a part of one of a plurality of information items;

receiving a quality reinforcement packet comprising a quality reinforcement plurality of portions, each of the quality reinforcement portions being corresponding to one or more data portions among the data portions;

selecting one or more information items among the information items;

setting the data portion corresponding to a part of the selected information items as a recovery process target;

associating the quality reinforcement packet with the data packet corresponding thereto;

determining whether there is a lost data packet based on presence/absence of a lost data packet; and recovering, when there is the lost data packet, at least the data portion set as the recovery process target in the lost data packet by using the data portion set as the recovery process target in a non-lost data packet and the quality reinforcement portion associated with the non-lost data portion, wherein when two or more information items are selected and the data portions set as the recovery process target are overlapped, the data portions set as the recovery process target are combined into one recovery target data block, and at least the data portion set as the recovery process target in the lost data packet is recovered by using the data portion included in the combined data block and the quality reinforcement portion corresponding thereto.

* * * * *